April 26, 1966  E. EMMET  3,248,175
APPARATUS FOR THE MANUFACTURE OF COMPOST
Filed Feb. 7, 1963  2 Sheets-Sheet 1

Inventor
*Eleonore Emmet*
By
*Holcomb, Wetherill & Brisebois*
Attorneys

April 26, 1966  E. EMMET  3,248,175
APPARATUS FOR THE MANUFACTURE OF COMPOST
Filed Feb. 7, 1963  2 Sheets-Sheet 2
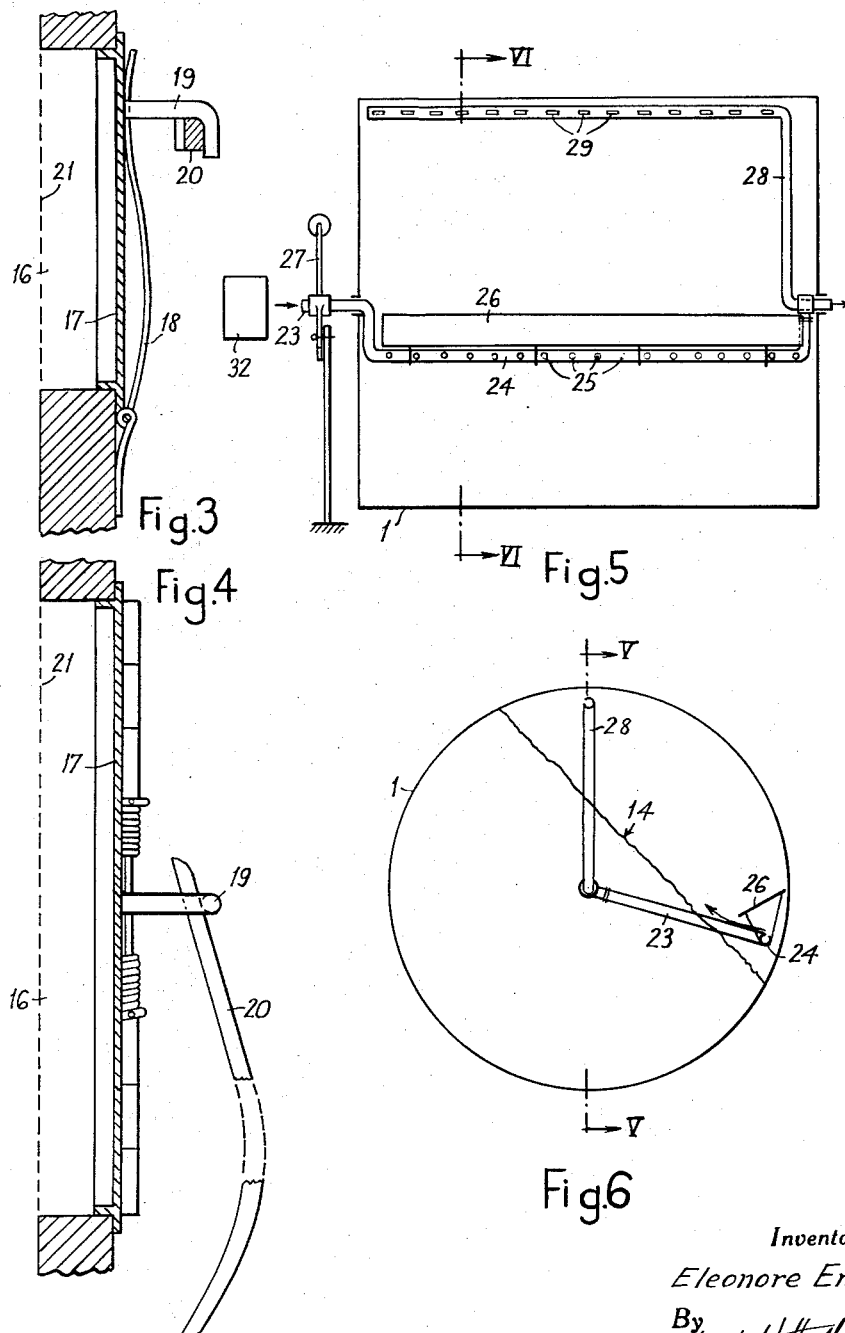
Inventor
Eleonore Emmet
By
Attorneys

3,248,175
APPARATUS FOR THE MANUFACTURE OF COMPOST
Eleonore Emmet, Vienna, Austria, assignor to Dunfix Etablissement, Vaduz, Liechtenstein
Filed Feb. 7, 1963, Ser. No. 257,007
5 Claims. (Cl. 23—259.1)

The invention relates to a process and apparatus for the production of compost from organic waste products such as town refuse, kitchen waste and faeces.

As is known, compost serves as an active soil fertiliser which is used to increase yields in the cultivation of useful plants. Its structure is essentially that of natural humus. Composting takes place under aerobic conditions: the high-molecular weight organic materials are split by enzymes of active micro-organisms, then they are either transformed into cellulosic substances or oxidised by natural oxygen. Since the energy contained in the organic material is at least in part transformed into heat, decomposition is usually accompanied by a self-heating effect and it is even possible to draw conclusions on the course of the decomposition from the temperature.

Regardless of the basic material, good compost can be recognised by its dark brown to blackish-brown colour. The colour and structure of the basic material are generally completely destroyed by the decomposition, and vegetable matter, paper or pieces of other materials are no longer recognisable as such. The smell is somewhat similar to that of a moist forest floor.

In practice, bulk manufacture of compost may be carried out with the material in heaps, in which the substances to be decomposed are kept stationary and damp and continuously permeated with fresh air through perforated concrete pipes provided at the bottom of each heap.

A period of time of about 60 to 90 days is needed, and also a considerable area is necessary for setting out a large number of heaps.

Machines for preparing compost from waste products have been proposed in which the waste products are mechanically moved in a container while passing air through the mass of waste products. In all cases the air supply has been distributed as evenly and constantly as possible through the material to be decomposed, and thus to permeate constantly with air all the particles of the material to be decomposed. Such processes are comparatively expensive and require considerable time for the production of good, i.e. ripe compost, although they are shorter than the heap processes.

It is an object of the invention to provide a simple and effective process and apparatus for the manufacture of compost from organic waste products.

A further object of the invention is to curtail the working time requirements of known methods of production of compost while maintaining yields of a high standard, so as to achieve commercially sound results in the production of compost. The invention is based on the theory that it is unnecessary, in achieving a rapid decomposition of the waste products, constantly to permeate with air all the particles of the material to be decomposed.

The process to which the invention relates, for the production of compost from organic waste products, by decomposition and aeration in a container, preferably a horizontal cylindrical rotating container which is only partly filled with waste products, in order to make a free space in the container over the space taken up by the waste products, the material in the container being turned or tumbled from the surface to the bottom, consists essentially in that the material to be decomposed, in the space it occupies, is enclosed on all sides by the walls of the container, and only the surface of the material is intensively permeated with warm moist air preferably having a temperature of at least about 40° C. to at the most about 65° C., or, if desired, 40° C. to 50° C., preferably an air-steam mixture at this temperature, the different parts of the material being successively aerated in the zone of the surface of the material until the whole body of the material has been processed in the cycle and being completely shut off from the air supply, after tumbling, by the layer of material lying on top. This stage of the process is followed by one in which all particles of the material to be decomposed are supplied during a certain period with warm moist air, or an air-steam mixture, only to spend a longer period completely shut off from the air, during which the micro-organisms which cause the decomposition process find good living conditions as a result of the effect of the moist warmth. As the process is a continuous one, the ripening conditions in the individual parts add together and yield ripe compost in a comparatively short period. By using this process, it is possible to arrive at a practically ripe compost after only one to three days, depending on the size of the load of the apparatus for carrying out the process, which is described below. The material to be decomposed can also be fed into the container without being sorted and virtually without being chopped up beforehand, which gives a further reduction in time and effort. The warm moist air may be produced either by heating air and moistening it with water or, preferably, by mixing air and steam. The process can be carried out in the following manner: the material fed into the container is exposed to the intensive aeration at its surface for a certain period and then this aerated part of the material is shut off from the aeration for another period, while the already aerated material comes out of the aeration area by the laying over it of another part of the mass, this taking place by the transfer of such part of the mass from the bottom layer to the top layer, or, if desired, the transfer of the material results automatically in a horizontal rotating drum, with this basic difference from known processes, that the aeration is carried out only on a part of the mass, especially at the surface of the material, and not through the whole mass of the material. Of course, the aeration also affects a zone of the material under the surface, but not the material to be decomposed which lies under this zone, this material being therefore completely shut off from the aeration and only arriving in the zone exposed to the aeration in the course of the cycle of the changing of layers of the substance to be decomposed in the container. For example, when using a horizontal rotating drum, it will be filled with substance to be decomposed only to a point which allows a free space to remain over it in the drum, and in this free space the warm air or air-steam mixture can be led in and then immediately led out during the treatment period.

As the drum rotates the surface of the material to be decomposed is inclined at e.g. 45°, the arrangement being such that the warm moist air or air-steam mixture is made to pass over the surface. As a result of the movement of rotation of the drum, which can be driven with a period of rotation which can vary from five minutes to a quarter of an hour, or can also be driven at intervals, depending on the size of the drum and on the size of the load of the substance to be decomposed, and also on the composition of this substance, new parts of the material to be decomposed are constantly appearing at the surface and being intensively permeated there for some time with the warm moist air. These parts, loaded with oxygen and moisture, return at last to the heart of the material to be decomposed and are thus completely shut off from the air supply. As this process is constant, the ripeness of the compost is soon achieved, at least enough for the material to be left to ripen afterwards.

When filling the drum with material for decomposition it is preferable for at least about a fifth of the weight of the inserted material to have nitrogen content and thus to consist of manure, faeces, blood, or similar substances. The humidity of the substance for decomposition should be high, but not so high that the substance drips. As a rule the vegetable substances or sediments contained in the material for decomposition guarantee a high moisture content.

The humidity of the air is suitably adjusted so that a loss of the necessary moisture content of the material for decomposition can be avoided.

If required, the material for decompositilon can be permeated before or after the above-described treatment with hot or superheated steam, in order to destroy any risks to health. The means of supply for the aeration can be used to this end, the drum being rotated the while, or again, a special steam supply may also be arranged. This sterilisation treatment is also a step in the direction of the task to be performed by the invention, that is, a reduction of the time necessary for the operation, as combating of pathogenic micro-organisms soon results from the effect of the high steam temperature. Besides, the substance provided for decomposition is completely enclosed during the short heat treatment at the beginning of the decomposition process and thus rendered particularly receptive for the organisms causing the decomposition.

If a preliminary treatment with hot or superheated steam is carried out, the bacteria which are advantageous for the compost, e.g. the nitrogen-binding bacterium Azotobacterium, are added after this preliminary treatment.

It is desirable, after completion of the treatment with moist air, to screen the decomposed material and finally immediately to fill air-tight sacks, silos or similar air-tight containers with the screened material, which then undergoes a further ripening without further treatment. In this way, too, the time spent in treating the material to be decomposed is reduced and commercially favourable conditions are achieved.

Should it be desired to avoid mildewing in the air-tight containers filled with compost, the containers may be provided with one or more small holes opening out into the outside air. This can be done in the exemplary use of air-tight sacks by leaving the sacks not quite fastened or with perforated pipes in them. In any case these small holes should not be big enough for the compost to dry as it stands.

The material remaining after the screening is freed of stones and glass fragments, and can serve as basic feeding material for the next load. By this means the decomposition of the sterilised material and/or material containing bacteria is accelerated and a reduction of the time spent in treating the material for decomposition is thus achieved.

The invention further relates to a simple and reliable device to carry out the accelerated compost process described above, which consists essentially in that the container, e.g. a drum, features an inlet for the air and/or air-steam mixture in its upper part, which remains clear when the drum is filled with the substance for decomposition, so that the air and/or air-steam mixture led into this clear space and over the surface of the material during the turning of the material or the rotation of the container may act on the surface of the material, and an outlet for the air and/or air-steam mixture out of this clear space after its action on the material. Preferably, the air and/or air-steam mixture is led in an upward direction in the direction of the surface of the material for decomposition in the drum which is inclined during the rotation of the drum.

To this end, the apparatus can be provided with an axial air supply pipe, which runs in generally U-shaped manner inside the drum, following the drum wall, and has openings for the expulsion of the air and/or air-steam mixture in the base of the U. The exit of the air inlet pipe can be covered by a protective strip or rail on the side facing the material for decomposition so as to avoid blocking-up during the operation. To set up the position of the exit holes in relation to the surface of the material, the air inlet pipe is made free to rotate or to rock and can be fixed from the outside. The rotatable drum consists preferably of wood and its periphery of wooden planks or bars laid alongside one another and surrounded by rings or a cage, some of the wooden planks or bars, e.g. four distributed over the periphery, are joined to the rings and the rest need only be laid in, or, if desired, slotted in, so as to form an enclosed casing after swelling. This casing will be kept sealed as a result of the moisture content of the material for decomposition to be found in the drum.

The rings can be toothed and connect with chains engaging round about half the periphery of the rings, these chains serving to drive the drum. In this arrangement of the drum in chains, part of the inner pressure on the drum wall is taken up by the chains, so that the metal rings can be of smaller dimensions than in an arrangement of the drum on roller bearings, as was normal previously.

In order that the invention may be more clearly understood, embodiments of apparatus for the manufacture of compost from organic waste products will now be described by way of example with reference to the accompanying drawings, in which:

FIGURES 3 and 4 are enlarged sectional views of a part of the apparatus shown in FIGURE 2; and FIGURES 5 and 6 are sectional views of a modified form of the apparatus of FIGURE 1, FIGURE 5 being a section along the line V—V in FIGURE 6, and FIGURE 6 being a section along the line VI—VI in FIGURE 5.

Figure 1:
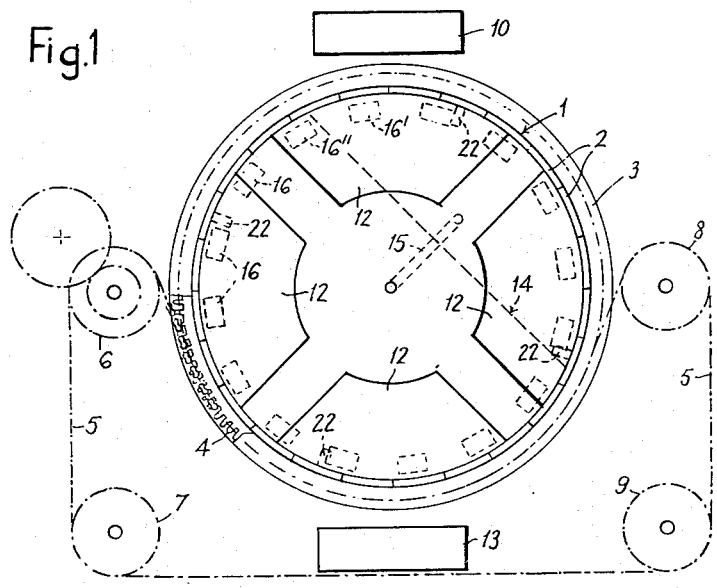
FIGURE 1 is a transverse cross-section of one form of apparatus.
Figure 2:
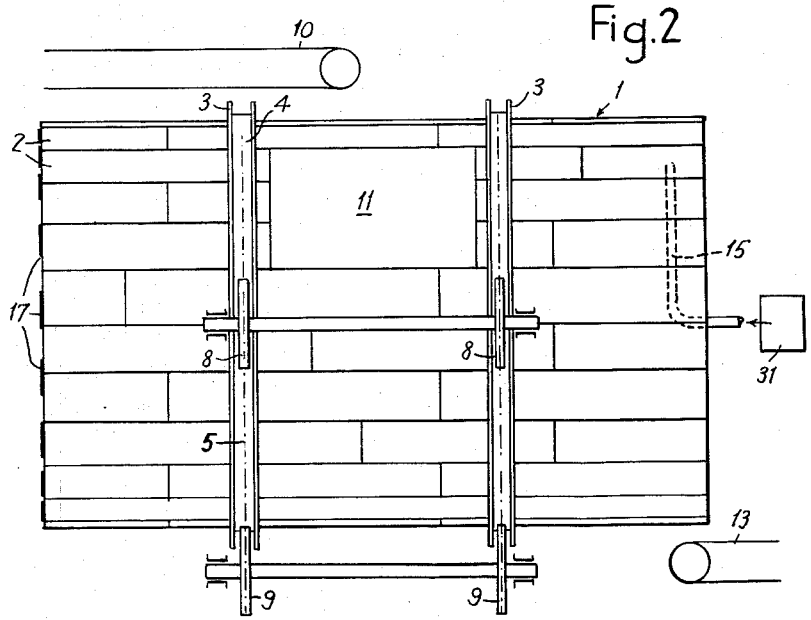
FIGURE 2 is a side elevation of the apparatus of FIGURE 1.

Referring to FIGURES 1 and 2, the drum 1 which may have a diameter of 5 m. or more, has a wooden wall made up of longitudinal planks or bars 2 which in this example have a rectangular cross-section, and which are laid in two steel rings 3. The bars 2 have, in this example, a cross-section of 5 x 10 cm., and they may also, as will be seen from FIGURE 2, be assembled from individual pieces running in the longitudinal direction. The snug fit of the bars 2 in the longitudinal direction results from the swelling of the wood which is caused by moisture, and is maintained by this swelling. It is unnecessary to arrange the bars 2 in radial planes so that they fit snugly when dry. If desired, the wooden bars may be slotted in the transverse direction.

The steel rings 3 are provided on their periphery with teeth 4, and hang in endless chains 5 which run over chain guiding wheels 6 to 9 and engage with the rings 3 over about half their peripheries. The chain wheels 6 are driven.

The material to be composted is supplied by a delivery belt 10 and fed through a closable opening 11 provided in the peripheral wall of the drum. The drum is preferably filled rather more than half-full. The drum is emptied on to a conveyor belt 13 through closable openings 12 provided at one end of the drum.

Warm moist air and/or an air-steam mixture from a source 31 is led through a pipe 15 into a free space in the drum above the material, the surface of which runs along the dotted line 14 as a result of the rotation of the drum. The pipe 15 passes through the centre of one end surface of the drum. Openings 16 are provided in the other end surface of the drum to allow the air to leave the free space after its action on the material, the openings 16 being covered by swivelling flaps 17 held down by springs 18 (FIGURES 3 and 4). One or more of the flaps 17 is opened to let the air out of the free space, and to this end, hooks 19 are fixed to the flaps 17, the hooks 19 running over guiding rails 20 the position of which is fixed and which cause the swivelling of each flap 17 at the desired place for a certain period. For example, opening 16' (FIGURE 1) is opened until the following opening 16" reaches the free space in the course of the rotation of the drum and is then opened in its turn. Of course, the openings 16 may also be used to supply fresh air while they are in the clear drum space, if this is desirable for the aeration which is taking place. In this case, only steam need be lead through the pipe 15, and the steam will mix with the fresh air in the free drum space.

The openings 16 are covered on their inner side by gratings 21, or some similar arrangement. In order to improve the movement of the material with the inner wall of the drum, spaced longitudinal bars 22 can be provided on the inner wall.

The drum (not shown) in which the compost is screened may be supported on chains in a similar way to the composting drum 1.

In FIGURES 5 and 6, the air and/or steam supply pipe 23 leading from a source 32 is generally U-shaped, air outlet holes 25 being provided in the bottom of the U and the air and/or air-steam mixture passing from the bottom over the inclined surface 14 of the material to be decomposed.

Care should be taken to avoid the blocking and stopping-up of the air outlet holes 25 by paper or cloth fragments in the material for decomposition. Therefore protective strips or rails 26 or some similar arrangement are provided in front of holes 25 (FIGURE 6). The air supply pipe 23 is suitably arranged so as to be free to swivel and can be controlled and locked from the outside by means of a lever 27. The swivelling arrangement makes it possible both to swivel the pipe 23 up out of the way while filling the drum, and also to adjust the position of the pipe 24 to the inclined surface 14 of the material. An outlet pipe 28 is provided, having air outlet slits 29 through which the air can also be sucked out.

I claim:

1. Apparatus for use in the manufacture of compost from organic waste products, comprising a drum, means for rotating said drum about a substantially horizontal axis, said drum having at least one opening for filling and emptying the drum, a closure for said at least one opening, inlet means independent of the rotation of the drum for admitting warm moist air into said drum at a point above said drum axis, the wall of said drum having an annular row of air outlets therein displaced from said axis, closure means for said air outlets, and means for successively opening said air outlet closure means as the drum rotates when said closure means, during rotation of the drum, are above said axis.

2. Apparatus for use in the manufacture of compost from organic waste products, comprising a generally cylindrical drum carried in at least two peripheral rings, said rings being toothed and supported on continuous driven chains, whereby said drum is rotatable about a substantially horizontal axis, a filling opening for filling said drum with a mass of waste products, a first closure for said filling opening, a discharge opening through which said drum may be emptied, a second closure for said discharge opening, a source of warm moist air, means connecting said source to inlet means in the drum, said inlet means comprising an inlet pipe mounted independently of the rotation of the drum to admit warm moist air into the drum substantially at the level of said axis, an annular row of air outlets in one wall of said drum displaced from said axis, spring-loaded closure means for said air outlet, and means for successively opening said closure means as the drum rotates when said closure means are above said axis.

3. Apparatus for use in the manufacture of compost from organic waste products, comprising a generally cylindrical drum carried in at least two peripheral rings, said rings being toothed and supported on continuous driven chains, whereby said drum is rotatable about a substantially horizontal axis, said drum having a filling opening for filling said drum with a mass of waste products, a first closure for said filling opening, said drum having a discharge opening through which said drum may be emptied, a second closure for said discharge opening, a source of warm moist air, means connecting said source to inlet means in the drum, said inlet means comprising an inlet pipe mounted independently of the rotation of the drum to admit warm moist air into the drum substantially at the level of said axis, said pipe being generally U-shaped within the drum, the base of the U being adjacent to the peripheral wall of the drum and having moist air discharge apertures, a protecting member arranged over said moist air discharge apertures, said pipe being adjustable in position and having locking means operable from outside the drum, and means for allowing air in the drum to exhaust therefrom, said means comprising an exhaust pipe within the drum, said exhaust pipe having at least one exhaust aperture, said exhaust pipe communicating with an exhaust outlet in said drum, said exhaust outlet being coaxial with said axis whereby said exhaust pipe can remain stationary when said drum is rotated about said axis.

4. Apparatus for use in the manufacture of compost from organic waste products, comprising a drum, means for rotating said drum about a substantially horizontal axis, said drum having at least one opening for filling and emptying the drum, a closure for said at least one opening, a source of warm moist air, means connecting said source to inlet means having at least one air discharge aperture in the space within the drum, said inlet means being mounted independently of the rotation of the drum to admit air into said drum substantially at the level of said axis and for adjustment of the position of said at least one aperture within the upper zone of the space within said drum, a protecting member arranged over said at least one air discharge aperture, means for adjusting the position of said inlet means from outside the drum, means for locking said inlet means in an adjusted position, and outlet means connecting with the upper zone of the space within the drum for allowing air in the drum to exhaust therefrom.

5. Apparatus for use in the manufacture of compost from organic waste products, comprising a drum, means for rotating said drum about a substantially horizontal axis, said drum having at least one opening for filling and emptying the drum, a closure for said at least one opening, inlet means independent of the rotation of the drum for admitting warm moist air substantially at the level of the axis of said drum above the compost therein and outlet means connecting with said upper zone of the space within the drum for allowing air in the drum to exhaust therefrom.

References Cited by the Examiner
UNITED STATES PATENTS

| | | | |
|---|---|---|---|
| 2,823,106 | 2/1958 | Pierson | 71—9 |
| 2,945,754 | 7/1960 | Hignett et al. | 71—64 |
| 2,954,285 | 9/1960 | Carlsson et al. | 71—64 |
| 2,969,277 | 1/1961 | Carlsson et al. | 71—64 X |
| 3,041,148 | 6/1962 | Ballantyne et al. | 71—9 |
| 3,055,744 | 9/1962 | Petersen | 71—64 |
| 3,092,467 | 6/1963 | Tempe | 71—64 X |

DONALL H. SYLVESTER, *Primary Examiner.*

ANTHONY SCIAMANNA, *Examiner.*